US012639998B2

(12) United States Patent
Lopes et al.

(10) Patent No.: US 12,639,998 B2
(45) Date of Patent: May 26, 2026

(54) VEHICLE PARKING BARRIER ACCESS CONTROL SYSTEM

(71) Applicant: Events.com, Inc., La Jolla, CA (US)

(72) Inventors: Gabriel Lopes, Culver City, CA (US); Guilherme Henrique Sehn, Santa Cruz do Sul (BR); Massoud Mollaghaffari, Tigard, OR (US); Igor Cornelio Lira, Portland, OR (US); Sohrab Vossoughi, Portland, OR (US)

(73) Assignee: Events.com, Inc., La Jolla, CA (US)

( * ) Notice: Subject to any disclaimer, the term of this patent is extended or adjusted under 35 U.S.C. 154(b) by 0 days.

(21) Appl. No.: 18/546,064

(22) PCT Filed: Feb. 8, 2022

(86) PCT No.: PCT/US2022/070561
§ 371 (c)(1),
(2) Date: Aug. 10, 2023

(87) PCT Pub. No.: WO2022/174219
PCT Pub. Date: Aug. 18, 2022

(65) Prior Publication Data

US 2024/0135765 A1 Apr. 25, 2024
US 2024/0233466 A9 Jul. 11, 2024

Related U.S. Application Data

(60) Provisional application No. 63/147,839, filed on Feb. 10, 2021.

(51) Int. Cl.

| | |
|---|---|
| *G07C 9/27* | (2020.01) |
| *G07B 15/04* | (2006.01) |
| *G07C 9/10* | (2020.01) |
| *E01F 13/06* | (2006.01) |

(52) U.S. Cl.
CPC ............... *G07C 9/27* (2020.01); *G07B 15/04* (2013.01); *G07C 9/10* (2020.01); *E01F 13/06* (2013.01)

(58) Field of Classification Search
CPC .................................... G07C 9/27; G07C 9/10
See application file for complete search history.

(56) References Cited

U.S. PATENT DOCUMENTS

| | | | | |
|---|---|---|---|---|
| 9,286,733 B2 | 3/2016 | Muirbrook et al. | | |
| 10,186,097 B2 * | 1/2019 | Tehranchi | G07C 9/28 | |
| 2012/0265585 A1 * | 10/2012 | Muirbrook | G07B 15/02 705/13 | |

(Continued)

FOREIGN PATENT DOCUMENTS

| | | | |
|---|---|---|---|
| CA | 3113494 A1 | 11/2021 | |
| WO | 2019132988 A1 | 7/2019 | |

*Primary Examiner* — Nabil H Syed
(74) *Attorney, Agent, or Firm* — Stoel Rives LLP

(57) ABSTRACT

A vehicle parking barrier access control system (10, 40) uses a mobile smart device (46) (e.g., mobile phone) to instantly open any mechanical barrier (12) such as a gate or door to enter and exit a parking area with restricted access without preregistration and prepayment activity and without one or both of interaction with parking attendants and payment system equipment. The vehicle parking barrier access control system is equipment manufacturer agnostic and eliminates a direct need to integrate with gate or door barrier software and hardware.

18 Claims, 7 Drawing Sheets

(56) References Cited

U.S. PATENT DOCUMENTS

| | | | | |
|---|---|---|---|---|
| 2015/0237167 | A1* | 8/2015 | Blanco | G07C 9/00309 709/204 |
| 2020/0153631 | A1* | 5/2020 | Carey | H04L 9/3213 |
| 2020/0211306 | A1* | 7/2020 | Thomas | G06Q 30/0207 |
| 2020/0242852 | A1 | 7/2020 | Rosas-Maxemin et al. | |
| 2020/0402402 | A1* | 12/2020 | Howell | G06Q 50/40 |

* cited by examiner

VEHICLE PARKING BARRIER ACCESS CONTROL SYSTEM

RELATED APPLICATIONS

This application is a national stage under 35 U.S.C. § 371 of International Application No. PCT/US2022/070561, filed Feb. 8, 2022, which claims priority benefit of U.S. Provisional Patent Application No. 63/147,839, filed Feb. 10, 2021, both of which are hereby incorporated by reference in their entireties.

COPYRIGHT NOTICE

© 2023 Citifyd, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This disclosure relates to vehicle parking access control systems and, in particular, such a system that is implemented to immediately open a mechanical barrier to allow vehicle access to enter and exit a parking area with restricted vehicle access without interaction with a human attendant or parking fee payment system equipment.

BACKGROUND INFORMATION

To manage and optimize their vehicle parking assets, many parking providers rely on one or more barriers, such as a gate or a door, to control entrance of vehicles into and exit of vehicles from the parking providers' properties. This approach to asset optimization and control requires installation of expensive equipment such as magnetic loops; electro-mechanical gates or doors; automated payment kiosks; sensors such as cameras, near field communication (NFC) card readers, Bluetooth beacons, optical scanners; or ticket dispensers, or combinations of them, to authorize and open the barrier to let the vehicle parker enter into and exit from the property. Moreover, many parking providers need to provide attendants at one or both of the exit gate and entrance gate to monitor and calculate the parking fee to be paid for use of the property. In such cases, upon payment of the fee, the attendant or automated gate equipment opens the exit gate to allow the vehicle parker to depart.

Recently, for frequent users (e.g., monthly vehicle parkers), use of sensor technology enables identification of a preregistered vehicle and its driver during ingress and egress, calculation of parking fees, and parking fee charges to the users' credit cards. However, all implementations of sensor technology methods (e.g., NFC/magnetic card/fob, license plate recognition (LPR) camera, optical scanners), require one or both of preregistration and prepayment of parking fees using a web portal or an App. Once the vehicle parker has one or both registered and prepaid the parking fee, the vehicle parker receives a QR code, a barcode, or an NFC-activated card to be scanned by (optical scanner) or tapped against (NFC) the gate equipment to activate the gate. Moreover, all these add-on technologies are equipment manufacturer specific, require extensive hardware and software integration, or both.

For transient vehicle parkers and one-time vehicle parkers, the vehicle parker usually activates an entrance gate by taking a ticket from an entrance ticket-dispensing machine and presents the ticket to an attendant at the exit gate for calculation of the parking fee and subsequent payment with credit card or cash. Another method entails having the vehicle parker pay the parking fee by use of a payment machine located at the exit gate. This method is disadvantageous because it requires time to process the parking fee and thereby causes formation of a line of vehicle traffic at the exit gate. A variation of this method locates the payment machine away from the exit gate for advance payment of parking fees to reduce queuing of cars at the exit gate. This method entails, however, providing a grace period of free parking to allow the vehicle parker to return to the parked vehicle, drive it to the gate, and then activate the gate to exit, thereby leading to lost revenue to the parking provider.

The existing methods carry burdensome recurring costs, including providing parking attendant personnel, purchasing and maintaining automated parking equipment, and integrating hardware and software sensors with existing equipment. For the transient and one-time vehicle parkers, the inconvenience and cost of prepayment or use of a web portal or an App to preregister for parking prohibits use of such technologies.

SUMMARY OF THE DISCLOSURE

The disclosed vehicle parking barrier access control system uses any mobile smart device (e.g., mobile phone) to instantly open any electro-mechanical barrier such as a gate or door to enter and exit a parking area with restricted access without preregistration and prepayment activity and without one or both of interaction with parking attendants and payment system equipment. An embodiment of the disclosed vehicle parking barrier access control system is implemented with a barrier to passage of a vehicle traveling for ingress to or egress from a restricted vehicle parking area. An access code source-providing medium provides a set of one or more sources of access code information to enable opening of the barrier. Each source in the set makes available an access code that is adapted for interaction with a gate App operating on a wireless-connection enabled mobile smart device associated with a vehicle parker seeking to open the barrier. The smart device is configured for communication over a long-range wireless communication link with a server to which a wireless connection protocol device is operatively connected and on which the system stores vehicle parking transaction information. A smart switch operatively associated with the barrier and configured for operation with a wireless connection protocol device communicates over a short-range wireless communication link to the smart device. The smart switch is responsive to an authorization signal developed by operation of the gate App in accordance with the access code and transmitted by the smart device to enable opening of the barrier to passage by the vehicle.

The vehicle parking barrier access control system is equipment manufacturer agnostic, allowing it to be used with any barrier, including electronic-operated door locks, and eliminates a direct need to integrate with gate or door software and hardware. No personal information is needed to use the system; only the vehicle parker's payment information is needed after entering and before exiting the parking area.

Additional aspects and advantages will be apparent from the following detailed description of preferred embodiments, which proceeds with reference to the accompanying drawings.

BRIEF DESCRIPTION OF THE DRAWINGS

FIGS. 3-1, 3-2, 3-3, 3-4, and 3-5 form an annotated flow diagram outlining and describing the process steps performed in the operation of the disclosed vehicle parking barrier access control system in the case of a vehicle driver entering into and exiting from a gated parking area having a smart switch in wireless communication with a barrier gate.

DETAILED DESCRIPTION OF PREFERRED EMBODIMENTS

Figure 1:
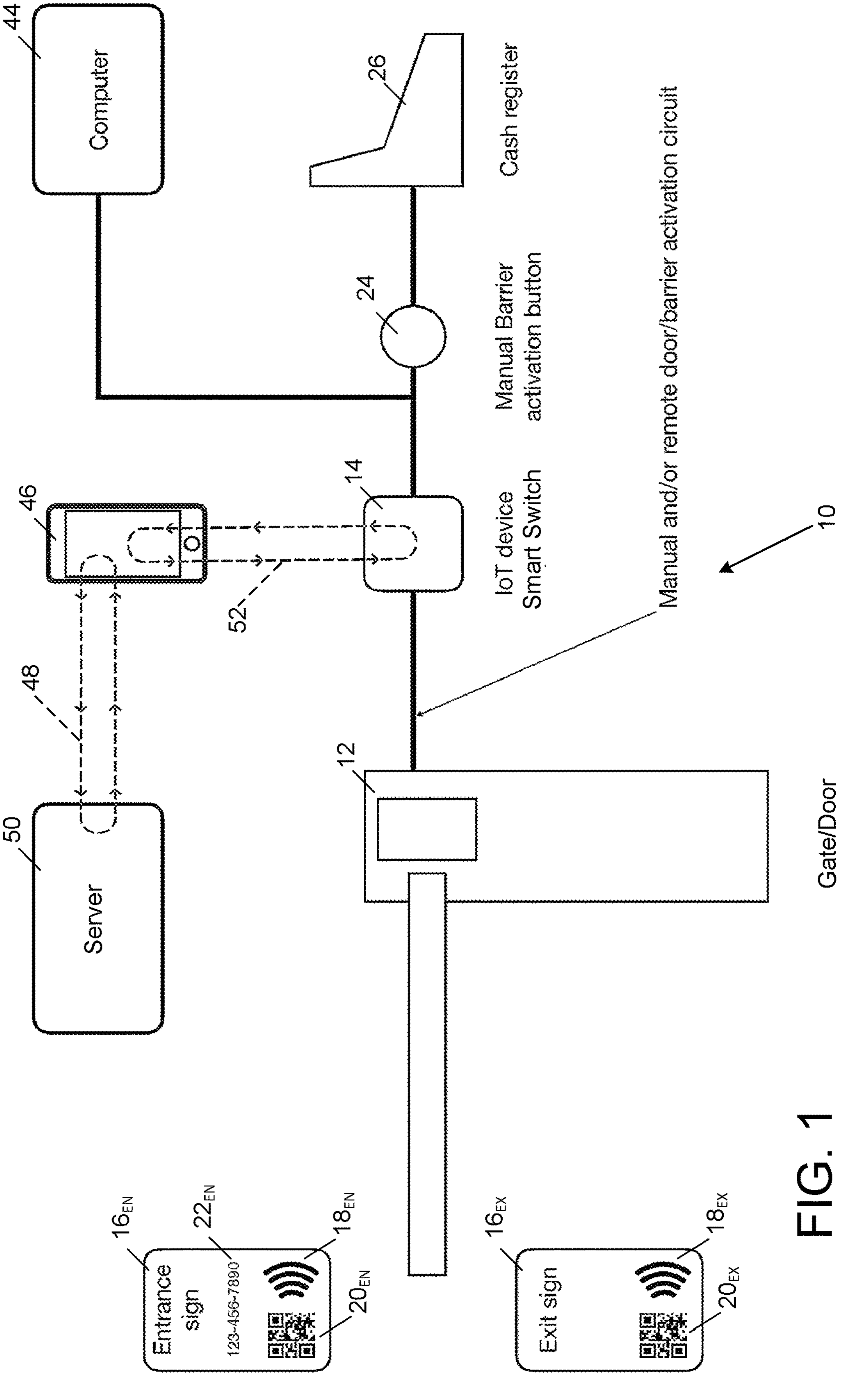
FIGS. 1 and 2 are simplified block diagrams of embodiments of equipment configured to control authorized opening and closing of a barrier to a vehicle parking area with restricted vehicle access.
Figure 2:
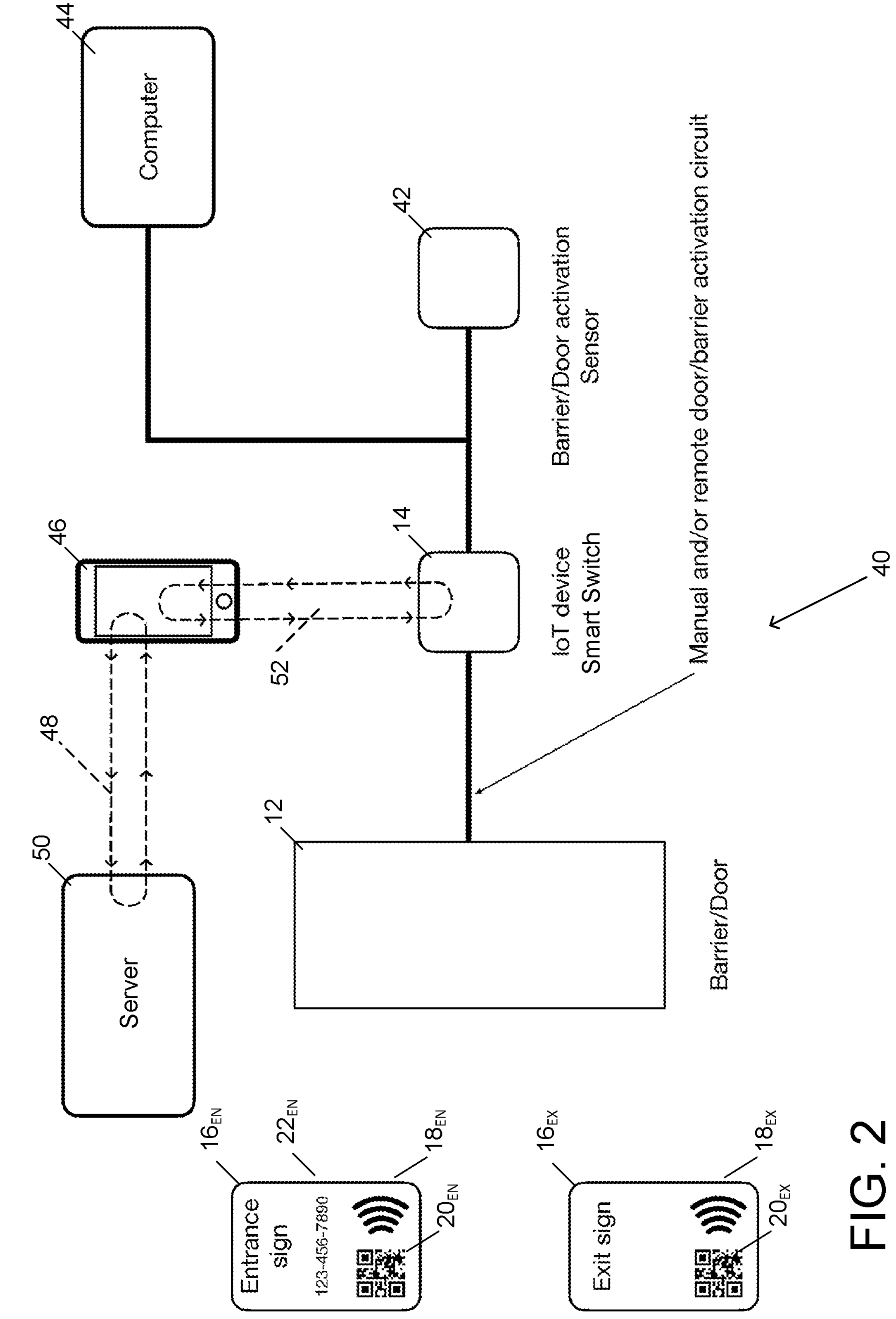

FIGS. 1 and 2 show embodiments of equipment configured to control, in cooperation with a vehicle parker's smart device, authorized opening and closing of a barrier to a vehicle parking area with restricted vehicle access. FIG. 1 represents an implementation controlling access to a vehicle parking area staffed by a parking area attendant having capability to manually actuate opening and closing of a barrier and collect parking fee payments. FIG. 2 represents an implementation controlling access to a vehicle parking area by automated operation of a barrier in wireless communication with a barrier activation sensor.

With reference to FIG. 1, a system 10 includes a gate or door barrier 12 implemented with barrier activation electronic circuitry to wirelessly communicate with an Internet of Things (IoT) smart switch 14 that is configured for operation with a wireless connection protocol device. Smart switch 14 is an operational part of the barrier activation circuitry and enables remote activation, manual activation, or both, of barrier 12. This placement of smart switch 14 in relation to barrier activation circuitry eliminates a direct need for integration with barrier operational software and hardware and thereby makes system 10 equipment manufacturer agnostic. A suitable smart switch 14 is a LazyBone V5 Smartphone Controlled Switch, which is available from Tinysine Electronics. Preferred access code source-providing media, each providing a set of one or more sources of access code information to enable opening of barrier 12, are an entrance sign $\mathbf{16}_{EN}$ and an exit sign $\mathbf{16}_{EX}$. Entrance sign $\mathbf{16}_{EN}$ positioned at barrier 12 makes available on its incoming vehicle-facing surface one or more access codes made available by corresponding access code sources for use by a vehicle parker. Preferred access codes include a radio signal code, such as that made available by an NFC tag $\mathbf{18}_{EN}$; a machine-readable code, such as that printed on an optical label in the form of a QR code $\mathbf{20}_{EN}$; and a short message service (SMS) short code and keyword $\mathbf{22}_{EN}$ displayed for use in sending a text message. An exit sign $\mathbf{16}_{EX}$ positioned at barrier 12 has on its outgoing vehicle-facing surface one or both of an NFC tag $\mathbf{18}_{EX}$ and a QR code $\mathbf{20}_{EX}$. A manual barrier activation control device or button 24 is available for operation by the parking area attendant to open or close barrier 12. A cash register 26 is also available for use by the parking area attendant to collect and process a parking fee payment.

With reference to FIG. 2, a system 40 includes barrier 12, smart switch 14, entrance sign $\mathbf{16}_{EN}$, together with one or more of its NFC tag $\mathbf{18}_{EN}$, QR code $\mathbf{20}_{EN}$, and SMS short code and keyword $\mathbf{22}_{EN}$, and exit sign $\mathbf{16}_{EX}$, together with one or both of its NFC tag $\mathbf{18}_{EX}$ and QR code $\mathbf{20}_{EX}$, and a barrier activation sensor 42. An example of barrier activation sensor 42 is an IP65 UHF RFID long range card reader parking system access control made available for purchase from online retailers by any one of several commercial suppliers. Use of a barrier activation sensor 42 eliminates need for a parking attendant and, therefore, availability of manual barrier activation button 24 and cash register 26.

With reference to FIGS. 1 and 2, a desktop computer 44 provided in each of systems 10 and 40 facilitates parking operator remote access to and control of barrier activation circuitry for barrier 12. Oftentimes, no attendant is present at, for example, a kiosk or cash register, in vicinity of the entrance or exit of the parking area. If a problem arises with a vehicle parking transaction or automatic barrier operation, a vehicle parker pushing a call button located near the entrance or exit can summon an offsite operator or attendant to operate barrier 12 remotely. Desktop computer 44 enables operator remote control of manual barrier activation button 24 or barrier activation sensor 42 in such circumstances.

For sake of simplicity, each of FIGS. 1 and 2 shows only one barrier 12 and one smart switch 14 in association with entrance sign $\mathbf{18}_{EN}$ and exit sign $\mathbf{18}_{EX}$. In practice, a first barrier 12 and its associated smart switch 14 would be positioned to control vehicle travel entering a parking area and a second barrier 12 and its associated smart switch 14 would be positioned to control vehicle travel exiting the parking area.

Systems 10 and 40 are configured so that a vehicle parker's smart device 46, typically a mobile phone, communicates over a long-range wireless communication link 48 to a backend server 50 and smart switch 14 communicates over a short-range wireless communication link 52 to smart device 46. A parking service provider stores in backend server 50 vehicle parking transaction information. Long-range wireless communication link 48 is established through cellular or Wi-Fi communication protocols, and short-range wireless communication link 52 is established through a short-range wireless radio signal communication protocol such as a Bluetooth® low energy (BLE) multiprotocol system.

The operation of system 10 and system 40 embodiments is described with reference to a flow diagram formed by FIGS. 3-1, 3-2, 3-3, 3-4, and 3-5 and the material presented below.

Figures 1, 3:
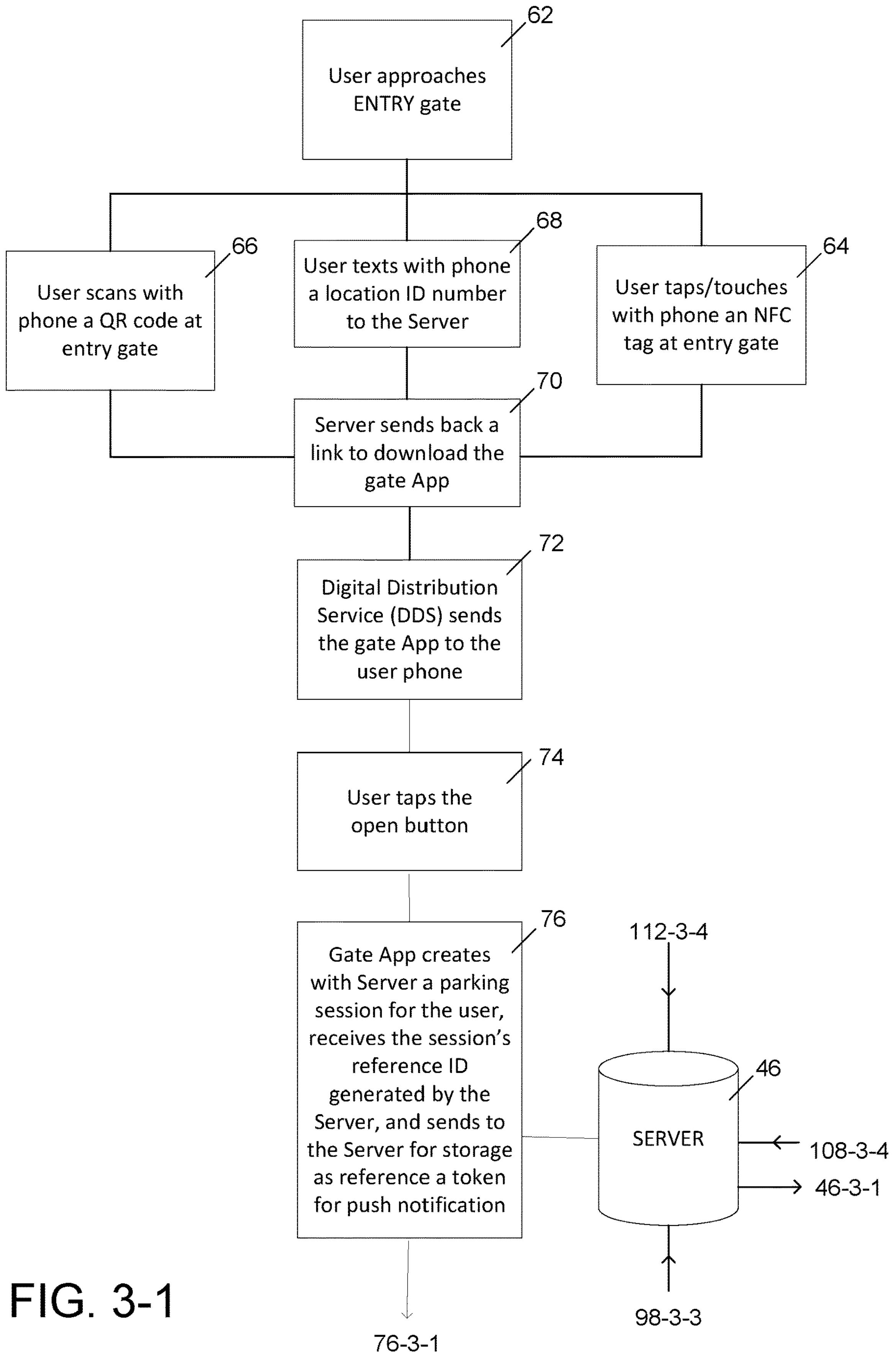
Figures 2, 3:
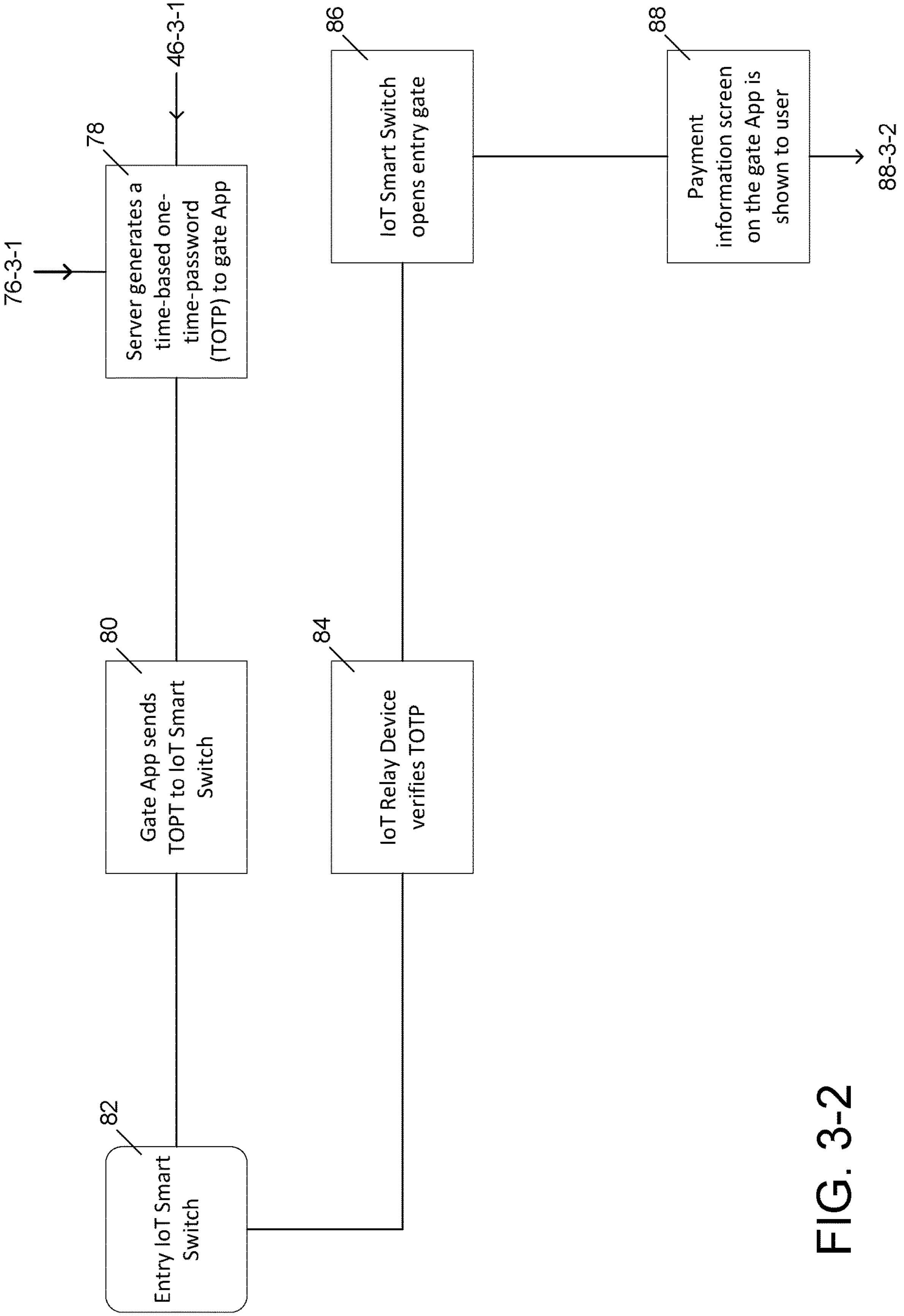
Figure 3:
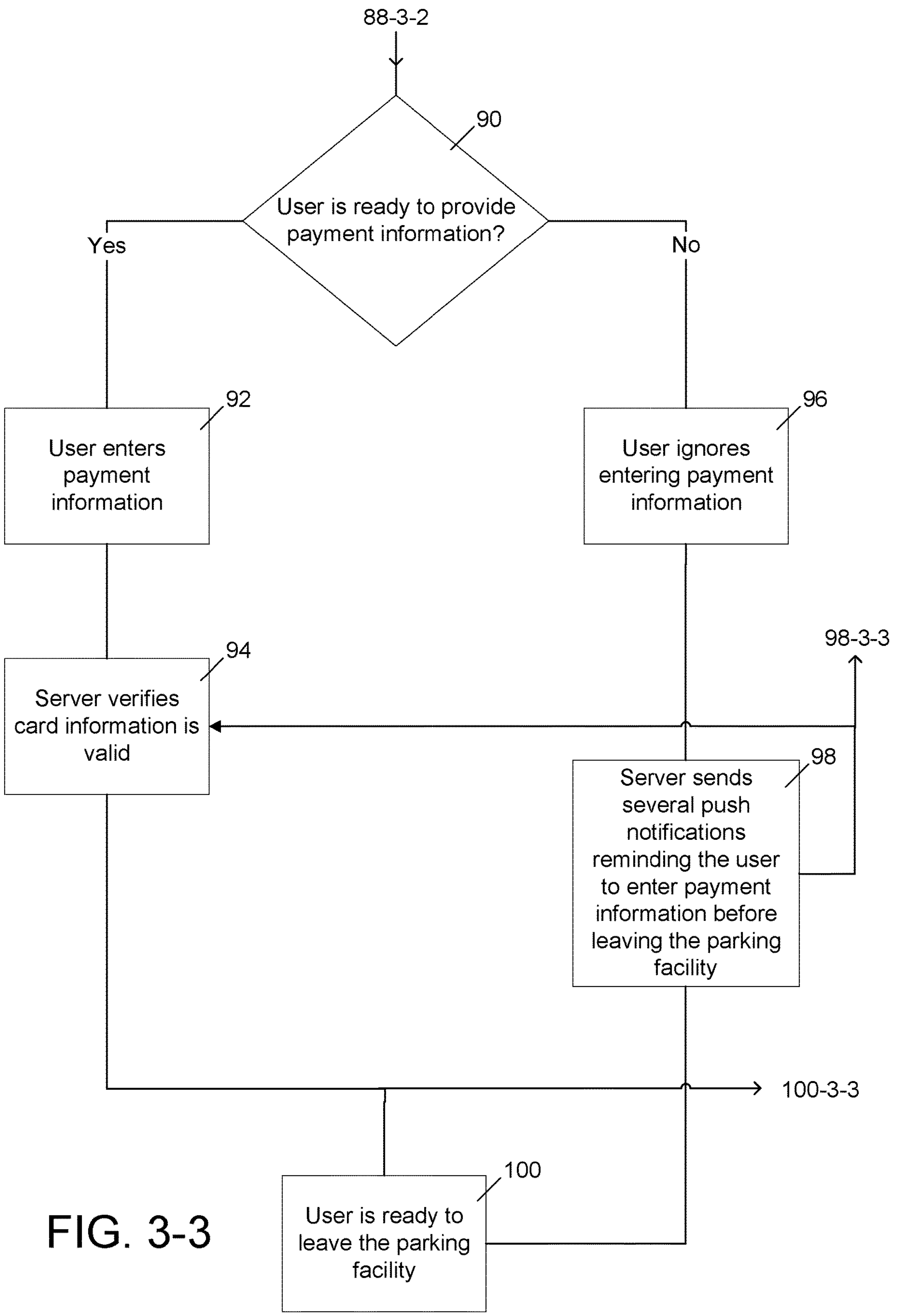

With reference to FIG. 3-1, the process flow begins with a vehicle parker (also referred to as user) driving, at process block 62, a vehicle to an entry barrier or gate 12 and obtaining an access code by tapping, at process block 64, on NFC tag $\mathbf{18}_{EN}$ (if mobile phone 46 uses NFC technology), scanning, at process block 66, QR code $\mathbf{20}_{EN}$ (using the camera of mobile phone 46), or entering, at process block 68, an SMS short code and location ID number $\mathbf{22}_{EN}$ (using mobile phone 46 to send a text message to server 50) provided on entrance sign $\mathbf{16}_{EN}$. Backend server 50 sends back, at process block 70, a hyperlink to mobile phone 46 for user download of a gate App. The gate App downloaded to mobile phone 46 enables quick performance of functions associated with barrier opening operations and mobile phone identification information acquisition to open barrier 12 for passage of a specific vehicle parker. The gate App performs a subset of tasks made available in a system App, of which the gate App is a small portion. If the system App has been previously installed on the vehicle parker's mobile phone 46, actuation of the hyperlink to download the gate App would be unnecessary to launch its functions. The gate App sent, at process block 72, by a digital distribution service (DDS) and operating on mobile phone 46 immediately presents a screen on which an "open" button contemporaneously appears. The gate App provides for immediate download of a small portion of functionality needed to operate barrier 12. Examples of a gate App include those downloaded from a DDS, such as App Clip from Apple Inc. and Android Instant from Google LLC. The act of tapping an NFC tag, scanning a QR code, or sending a text message at the entry gate and then sending to the vehicle parker the gate App to activate the entry gate eliminates a vehicle parker's need to find and download an App preparatory to entering the parking area, and thereby speeds the time of ingress to it. Tapping an NFC tag, scanning a QR code, or sending a text message at the entry gate or tapping an NFC tag or scanning a QR code at the exit gate inevitably indicates that the vehicle parker is present at the gate and allows only that vehicle parker to enter or exit the parking area. This technique eliminates a need for detecting the exact position of the vehicle at the entry or exit gate, which opens only for the vehicle present at the gate.

By tapping the open button, at process block 74, the vehicle parker causes mobile phone 46 to communicate with backend server 50 to open entry barrier 12. An alternative implementation eliminates presentation and user tapping of the open button and instead causes barrier 12 to open in immediate response to any one of the tapping, scanning, texting actions represented by process blocks 64, 66, 68, respectively. This alternative implementation eliminates presentation of a display screen, thereby reducing the gate App file size, and eliminates the user task of pushing the open button.

The gate App, together with backend server 50, at process block 76, creates a parking session. The gate App receives a reference ID generated by backend server 50 for the parking session and sends to backend server 50 for storage as reference a token for push notification. Mobile phone 46 captures the entrance time, which is recorded by backend server 50. There is no need for the vehicle parker to, before arrival at and entrance to the parking area, install an App, preregister, or prepay to create a parking session.

With reference to FIG. 3-2, backend server 50 generates, at process block 78, for delivery to the gate App a time-based one-time password (TOTP). The gate App, at process block 80, sends the TOTP to smart switch 14, which, at process block 82, receives the TOTP and, at process block 84, verifies the TOTP. Smart switch 14, at process block 86, opens entry barrier 12.

At the moment of activation of entry barrier 12, the gate App opens, at process block 88, a payment information screen. The payment information screen presents to the user an option to pay with credit card or debit card, by mobile payment service, (e.g., Apple Pay or Google Pay Send), or with cash. With reference to FIG. 3-3, a decision box 90 represents an inquiry as to whether the user is ready to provide payment information. If the answer is Yes and the user selects the credit card or debit card payment option, the user, at process block 92, enters the payment information on the gate App; and backend server 50, at process block 94, verifies that the payment information (e.g., credit or debit card number and expiration date) is valid. If the answer is Yes and the user selects the mobile payment service option, the user, at process block 92, need not enter payment information because it had already been submitted to the mobile payment service provider during an account registration process. If the answer is Yes and the user selects the cash payment option, the user, at process block 92 receives on mobile phone 46 from backend server 50 a machine-readable code (e.g., QR code) that contains information including date and time of vehicle entrance. The payment screen instructs the vehicle driver to present the QR code for scanning by an attendant stationed at exit barrier 12. If the answer is No, the user, at process block 96, ignores an opportunity to enter payment information on the payment information screen presented by the gate App. Backend server 50, at process block 98, sends several push notifications reminding the user to select or enter payment information on the payment information screen. This reminder is pushed several times to the user's mobile phone 46 within the following hour. At any time during the parking session, the user has an ability to select and enter payment information. Once backend server 50 detects completion of payment selection and information, a screen for vehicle exit is activated, at process block 100, but is not yet operable.

Figures 3, 4:
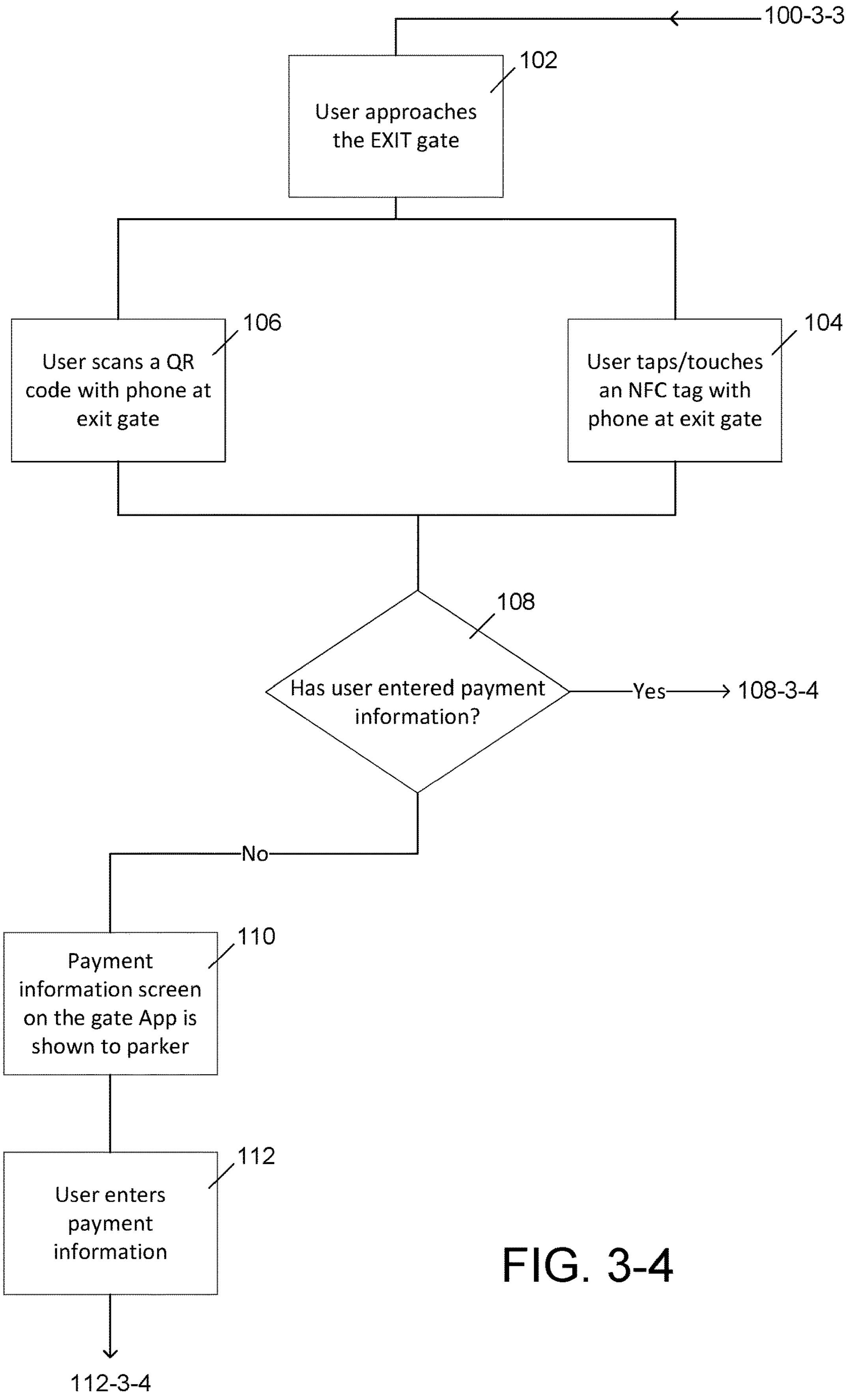

With reference to FIG. 3-4, the vehicle parker driving, at process block 102, to exit barrier 12, with mobile phone 46, taps, at process block 104, an NFC tag $\mathbf{18}_{EX}$ or scans, at process block 106, QR code $\mathbf{20}_{EX}$ provided on exit sign $\mathbf{16}_{EX}$ at exit barrier 12.

Figures 3, 4, 5:
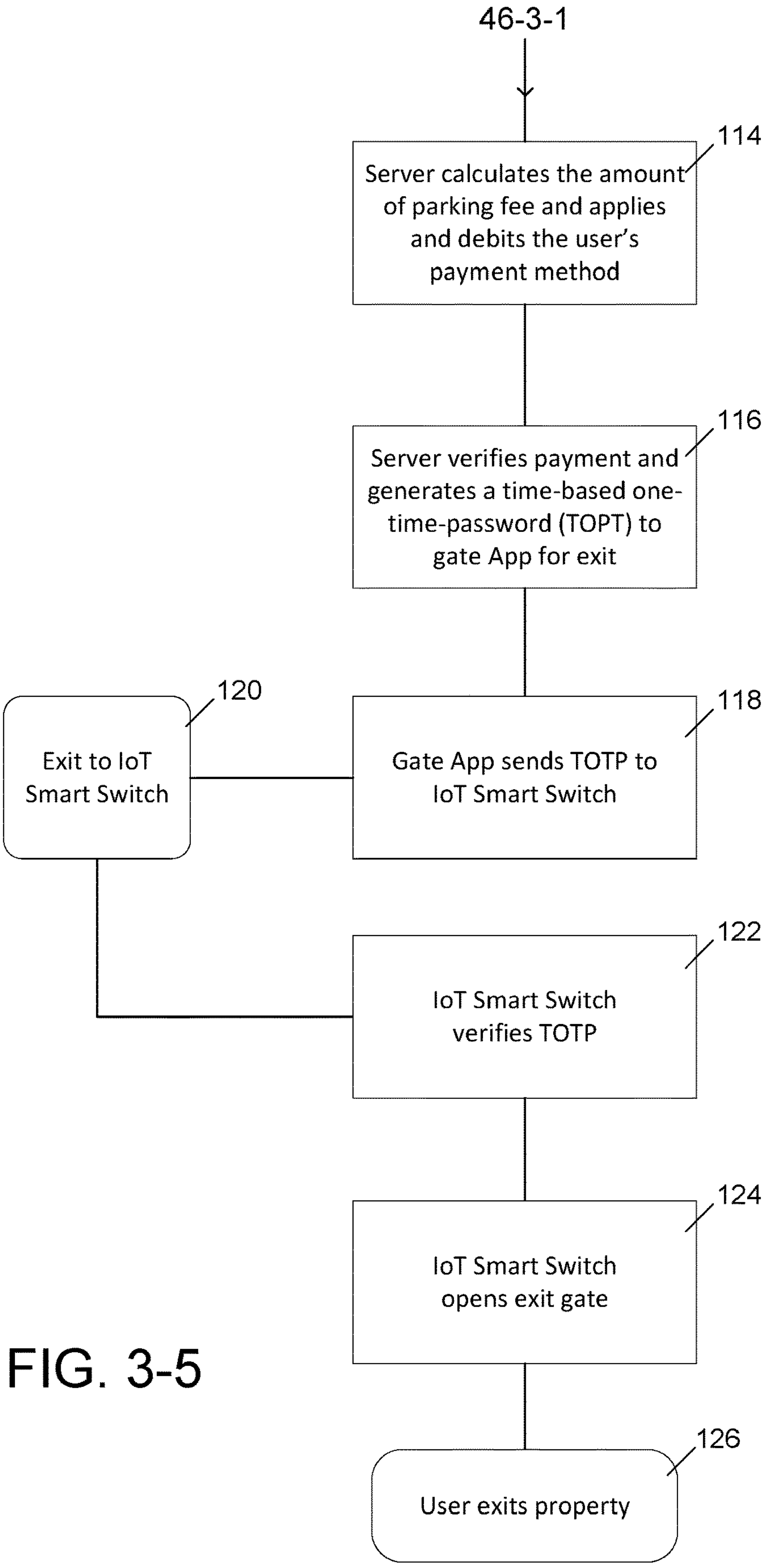

Decision box 108 represents an inquiry as to whether the user entered the payment information specified on the gate App at process block 88. If the answer is No, the gate App presents, at process block 110, the payment information screen, and the user enters, at process block 112, the payment information for either the credit card or debit card option or the mobile payment service option. With reference to FIG. 3-5, if the answer is Yes and the user selected the option to pay with credit card or debit card or by mobile payment service, or after the user has entered the payment information at process block 112, mobile phone 46 captures the exit time, which is recorded by backend server 50. Backend server 50, at process block 114, determines the session duration, calculates the fee, debits the user for the fee amount due, and sends to mobile phone 46 for transmission to smart switch 14 an authorization signal to open barrier 12 in accordance with the processing sequence described below.

Backend server 50 provides, at process block 116, to the user a digital receipt with all required information and generates a time-based one-time password (TOTP) to the gate App for exit. The gate App, at process block 118, sends the TOTP to smart switch 14, which, at process block 120, receives the TOTP and, at process block 122, verifies the TOTP. Smart switch 14, at process block 124, opens exit barrier 12 and clears the way for the vehicle to exit the parking area, as indicated at process block 126.

If the user selected the option to pay with cash, the user performs entering the payment information as indicated at process block 112 by presenting, for scanning by the exit barrier attendant, the QR code received from backend server 50 by mobile phone 46 upon entrance to the vehicle parking area. A smart device carried by the exit barrier attendant connects and provides the QR code information to backend server 50, which determines from the entrance and exit times the duration of the parking session and communicates to the exit barrier attendant's smart device the fee amount payable by the user, as indicted at process block 114. Upon receipt of the cash payment by the vehicle driver, the exit barrier attendant actuates manual barrier activation button 24 to cause smart switch 14, at process block 124, to open exit barrier 12 and allow the vehicle to exit the parking area, as indicated at process block 126. Skilled persons will appreciate that parking fee payment with cash to a human parking area attendant makes unnecessary process steps 116, 118, 120, and 122 relating to generation by backend server 50 of a TOTP to the gate App for vehicle exit.

Process block 78 and process block 116 each refer to generation of a time-based one-time password (TOTP) to the gate App for vehicle entry and vehicle exit, respectively. A TOTP is used to verify that a barrier opening transaction is authorized by backend server 50 as a form of two-factor authentication to prevent malicious agents from opening barrier 12 without authorization (for example, opening exit barrier 12 without paying for the parking session).

The algorithm is defined by RFC 6238 (https://tools.ietf.org/html/rfc6238).

The TOTP is generated by backend server 50 (provider) and verified by smart switch 14 (verifier), in which both use the current Unix time and a shared secret. The TOTP is generated on backend server 50 and transmitted to the gate App, and then forwarded to smart switch 14 via Bluetooth® wireless connection.

During a barrier opening transaction, backend server 50 generates a TOTP that is valid for a specific amount of time (e.g., 30 seconds) in which smart switch 14 can assure its authenticity from backend server 50. The time limitation prevents a one-time password from being shared among other individuals, and the shared secret known only by backend server 50 and smart device 14 is used to generate hashed one-time passwords to prevent non-server agents from opening barrier 12.

Possible clock drifts between backend server 50 and smart switch 14 can necessitate time resynchronization. Time resynchronization can be executed continuously as described under RFC 4226 paragraph "6. Resynchronization."

In case of longer clock drifts, such as those occurring in a power outage event (which can be minimized by use of a battery as backup power for smart switch 14) where a connection to the Internet is not available from smart switch 14, backend server 50 might lose time synchronization with smart switch 14.

Once it is turned on, smart switch 14 will have a specific flag activated that indicates smart switch 14 is in a resynchronization mode. When it is in resynchronization mode, smart switch 14 will accept a pair of a one-time password (OTP) and a timestamp provided by the gate App on its first transaction since reboot, under two conditions. The conditions are that the OTP can be validated for the timestamp provided and that the timestamp provided is later than the latest timestamp stored before the smart switch 14 lost power. If the given pair is valid, the clock of smart switch 14 will be set to the timestamp provided, and the resynchronization mode will be deactivated. Otherwise, if the given pair is not valid, smart switch 14 and the gate App can work together to identify mismatching time differences with backend server 50 and notify needed resynchronization to appropriate agents for manual resynchronization with a direct password-protected connection to smart switch 14 at its location.

Implementation of the TOTP in either of systems 10 and 40 prevents malicious gate opening without smart switch 14 being connected to the Internet or having a stable Internet connection, thereby reducing hardware requirements. Time resynchronization solves this potential issue without Internet connectivity.

It will be obvious to those having skill in the art that many changes may be made to the details of the above-described embodiments without departing from the underlying principles of the invention. The scope of the present invention should, therefore, be determined only by the following claims.

The invention claimed is:

1. A vehicle parking barrier access control system, comprising:

a barrier to passage of a vehicle traveling for ingress to or egress from a restricted vehicle parking area;

a smart switch operatively associated with the barrier, the smart switch configured for operation with a wireless connection protocol device to communicate over a short-range wireless communication link;

an access code source-providing medium making available to a vehicle parker a set of one or more sources of access code information to enable opening of the barrier, the access code information being made available to the vehicle parker as the vehicle approaches or is present at the barrier to commence creation of a parking session with no need for parking session pre-registration, each source in the set making available an access code adapted for interaction with a gate App operating on a wireless-connection enabled mobile smart device associated with the vehicle parker seeking to open the barrier, the mobile smart device configured for communication over the short-range wireless communication link with the smart switch and over a long-range wireless communication link with a server to which a wireless connection protocol device is operatively connected and on which the system stores vehicle parking transaction information, and, in response to communication from the vehicle parker of access code information available from the set of one or more sources, the gate App cooperating with the server to create the parking session while the vehicle is present at the barrier; and a time-based, one-time password (TOTP) of time-limited validity generated by the server upon the creation of the parking session to verify that a barrier opening transaction is authorized by the server, the server configured to transmit, during initiation of the barrier opening transaction, the TOTP to the gate App for verification by the smart switch, the TOTP transmitted to the gate App being valid for a short amount of time that is limited to cause the gate App to develop for response by the smart switch an authorization signal in accordance with the access code, allow the gate App to forward to the smart switch the TOTP to verify its authenticity and thereby allow response by the smart switch to the authorization signal to enable opening of the barrier to passage by the vehicle, and thereafter conclude the barrier opening transaction to prevent sharing of the TOTP with another vehicle parker aiming to open the barrier.

2. The vehicle parking barrier access control system of claim 1, in which the barrier includes barrier activation circuitry of which the smart switch is an operational part and thereby makes unnecessary integration with barrier operational software and hardware.

3. The vehicle parking barrier access control system of claim 1, further comprising a manual barrier activation control device operatively connected to the smart switch to enable, in response to the authorization signal, human actuation of the manual barrier activation control device to open the barrier.

4. The vehicle parking barrier access control system of claim 3, further comprising a computer that is operatively connected to barrier activation circuitry associated with the manual barrier activation control device and is configured to enable parking service operator remote control of the manual barrier activation control device.

5. The vehicle parking barrier access control system of claim 1, further comprising an activation sensor operatively connected to the smart switch to enable, in response to the authorization signal, automated actuation to open the barrier.

6. The vehicle parking barrier access control system of claim 5, further comprising a computer that is operatively connected to barrier activation circuitry associated with the activation sensor and is configured to enable parking service operator remote control of the activation sensor.

7. The vehicle parking barrier access control system of claim 1, in which the access code is a machine-readable code.

8. The vehicle parking barrier access control system of claim 7, in which the set of one or more sources of access code information includes an optical label and the machine-readable code is provided on the optical label.

9. The vehicle parking barrier access control system of claim 8, in which the optical label contains a QR code.

10. The vehicle parking barrier access control system of claim 1, in which the access code is a radio signal code.

11. The vehicle parking barrier access control system of claim 10, in which the set of one or more sources of access code information includes a near field communication (NFC) tag and the radio signal code is provided by the NFC tag.

12. The vehicle parking barrier access control system of claim 1, in which the set of one or more sources of access code information includes a sign and the access code appears on the sign as printed information for use by the vehicle parker to send a text message.

13. The vehicle parking barrier access control system of claim 1, in which, in interacting with the access code, the gate App captures for transmission to the server a parking session entrance time of the vehicle traveling for ingress to the vehicle parking area and develops for response by the smart switch the authorization signal to open the barrier.

14. The vehicle parking barrier access control system of claim 1, in which, in interacting with the access code, the gate App captures for transmission to the server a parking session exit time of the vehicle traveling for egress from the vehicle parking area and develops for response by the smart switch the authorization signal to open the barrier.

15. The vehicle parking barrier access control system of claim 1, in which:

in interacting with the access code associated with the barrier at an entrance to the vehicle parking area, the gate App captures for transmission to the server a parking session entrance time of the vehicle traveling for ingress to the vehicle parking area;

in interacting with vehicle parker's payment selection information acquired by the server in cooperation with the gate App after creation of the parking session and associated with the barrier at an exit from the vehicle parking area, the gate App captures for transmission to the server a parking session exit time of the vehicle traveling for egress from the vehicle parking area, the parking session entrance time and the parking session exit time providing transaction information for determination, by the server, of a duration of and a corresponding fee for the parking session; and the gate App transmits from the mobile smart device to the server payment information relating to the vehicle parker for application of the parking session fee to debit the vehicle parker for the fee amount due.

16. The vehicle parking barrier access control system of claim 15, further comprising a barrier activation control device in operative connection to the smart switch and a smart device associated with a parking service operator, and in which:

the vehicle parker's payment selection information includes selection of a cash payment option;

in response to the selection of the cash payment option, the mobile communication device presents to the communication device associated with the parking service operator for transmission to the server the access code information including the parking session entrance time and the cash payment selection information; and upon receipt of the parking session entrance time and the cash payment selection information, the server transmits the parking session fee to the smart device associated with the parking service operator for collection and actuation of the barrier activation control device by the parking service operator to open the barrier at the exit from the vehicle parking area.

17. The vehicle parking barrier access control system of claim 15, in which:

the vehicle parker's payment selection information includes selection of a non-cash payment option;

in response to the selection of the non-cash payment option, the mobile communication device captures the parking session exit time and transmits to the server session calculation information including the parking session entrance and exit times and the non-cash payment selection information; and upon receipt of the session calculation information, the server generates and transmits to the gate App an exit TOTP of time-limited validity, the gate App sending to the smart switch the exit TOTP for verification of its validity to open the barrier at the exit from the vehicle parking area.

18. The vehicle parking barrier access control system of claim 17, in which the vehicle parker's non-cash payment option includes credit, debit, or mobile payment service.

* * * * *